3,073,130
PROCESS OF AND APPARATUS FOR LOW-TEMPERATURE DECOMPOSITION OF GAS MIXTURES

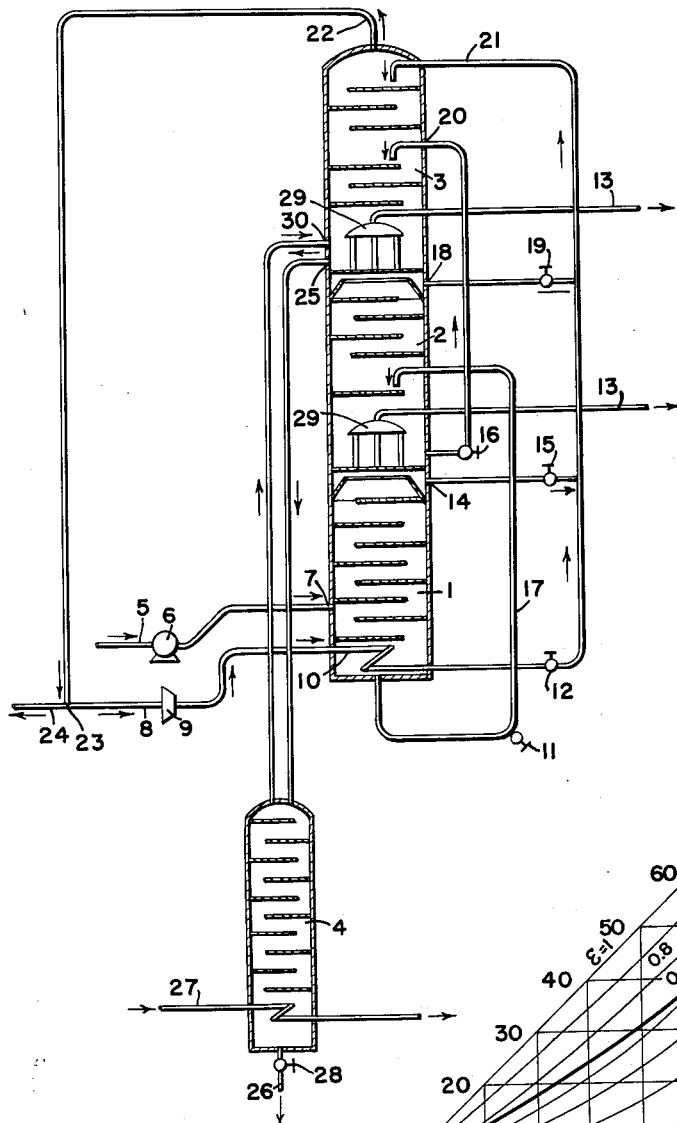
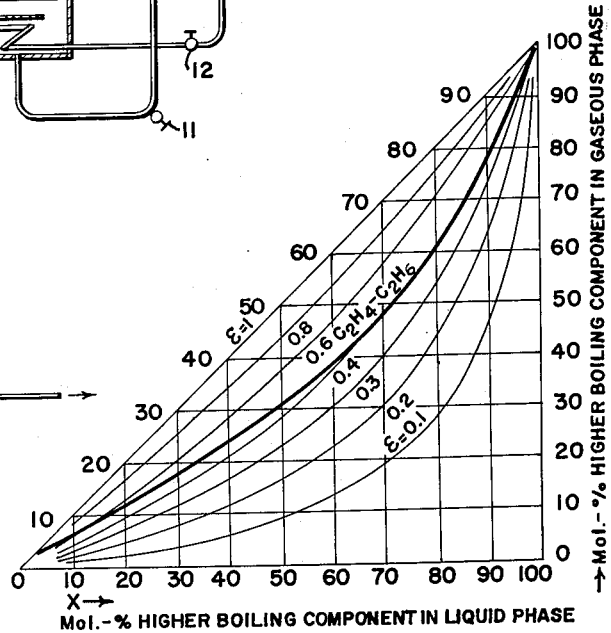
FIG.2
FIG.1

Rudolf Becker, Munich-Solln, Germany, assignor to Gesellschaft für Linde's Eismaschinen Aktiengesellschaft, Hollriegelskreuth, near Munich, Germany, a German company
Filed July 18, 1960, Ser. No. 43,669
Claims priority, application Germany July 25, 1960
5 Claims. (Cl. 62—28)

This invention relates to a process and an apparatus for the separation of gas mixtures by means of low-temperature rectification, especially for the separation of $C_2$ mixtures with two or more components, in which mixture at least one component is present in relatively small amount, which mixtures have a boiling diagram approximately according to the curve $C_2H_4$—$C_2H_6$ shown in FIG. 1 of the accompanying drawing.

In such gas mixtures the equilibrium curve for the dependence of the composition in vapor state on the composition in liquid state for higher or lower boiling, does not lie on the thin extended curve corresponding to the equilibrium of ideal mixtures at given vapor pressure ratios, $\epsilon$ but cuts across this for small amounts of higher or lower-boiling in the fluid. Here the parameter $\epsilon$ is equal to the ratio of the vapor pressure of the higher-boiling $\pi_1$, to the lower boiling $\pi_2$. The equilibrium curve itself is represented by the function $$y=\frac{\epsilon x}{1-(1-\epsilon)x}$$

in which $x$ is the mol fraction of the higher-boiling component in the liquid, and $y$ the mol fraction of the higher-boiling compoment in vapor at equilibrium.

The process according to this invention may also be carried out successfully, in general, on any gas mixture in which the vapor pressure ratio $\epsilon$ is greater than 0.3. Moreover, the process may be carried out to advantage when in a gas mixture one component is present in very low concentration.

Gas mixtures which have a boiling diagram such as that described are difficult to separate. The problem of the present invention is to attain this separation with considerably less outlay than heretofore, especially when one component is present in very slight amount.

The separation of such gas mixtures in a single rectification column with very great circulation of the gas is, in principle, possible and is known. This however, is economically unfeasible. A reduction of the gas circulation can be attained in an arrangement of several columns, particularly as suggested in German Patent No. 1,048,600. That process involves, however, a considerable increase in the original pressure of the gas mixture to be separated, since each column must have a higher pressure than the one following it. The saving in energy by the smaller amount circulated may not be realized because of the increase of the crude gas and circulation pressure.

According to the present invention, on the contrary, in an arrangement of several columns, in each column only the component is recovered pure which predominates by amount in the gas mixture, while the other component is or components are recovered pure in an auxiliary column working at the same pressure.

The subject of this invention is, accordingly, a process for the separation of gas mixtures by means of low-temperature rectification in a main rectification apparatus consisting essentially of at least three successively connected rectifying columns and an auxiliary column, in which the mixture is first conducted to the first rectifying column under the highest pressure, between head and foot according to its composition, and is there separated, on which a part of the component, present in greater amount in the original gas, is drawn off as a pure product and the remaining impure product is conducted into the next column, under lower pressure, at an appropriate point, in which more of the same component is drawn off as a pure decomposition product and the impure product is introduced into another column, under still lower pressure; in the process, the heat set free in the condensation of the gas flowing into the several columns is transferred to the foot of the several columns plus the auxiliary ($n+1$ columns) for the evaporation of the sump fluid boiling there. It is distinguished by the fact that from the column of the main tower having the lowest pressure, a mixture of both components is removed and rectified in an auxiliary column at the same pressure, while the component present in smaller amount in the original mixture is recovered pure, and drawn off from the auxiliary column, while an impure mixture is conducted back to the last of the main column group under the lowest pressure.

The advantage of the process according to this invention is that it avails itself of the gain of the smaller circulation amount in a several-column arrangement, but by means of the auxiliary column operated at the pressure of the last stage of the main column, it holds the original and circulation pressures lower than in the known processes and is therefore much more profitable than they.

This process is carried out in a rectifying apparatus which consists of a main and an auxiliary column. The main column is made up of at least three rectifying columns, which, for simplicity, will be referred to hereinafter as stages of the main column. These individual steps are so connected together that in each only the heat from their number ($n$) is transferred into ($n+1$) stages. This is effected to advantage by arranging these stages one above the other and connecting them through condensor-evaporators. They may be arranged side by side, if by suitable means the heat is transferred from one column to the others in the known way, as described in detail in German Patent 1,048,600.

The pressure in the individual steps is so selected that at the head of a column the gas condenses at the temperature at which the fluid in the sump of the following column evaporates. The gas mixture to be separated diminishes from stage to stage.

The auxiliary column consists of a single column, which is not connected as to heat with the main column. It may either be combined with the main column into a single unit, or may be set up separately.

The gas mixture to be separated is introduced, preferably liquid, into that stage of the main column which is under the highest pressure. For simplicity, I shall assume in the following that the mixture consists of two components. Mixtures with several components can also be processed, but in each arrangement of the kind described only the main component can be recovered pure; the others are removed together. The latter may then be further separated by the same process.

The component present in the original gas in greater amount is removed pure and in liquid form from the first stage, at the head if the lower-boiling component is present in greater amount; at the foot, if the higher-boiling component predominates. The pure product removed is expanded and conducted—with the pure product removed similarly from other stages—either as a washing liquid or at least partially to the condenser-evaporator at the head of the stage which is under the lowest pressure. The impure liquid mixture collects at the foot—or, as the case may be, at the head—of the stage and is there removed.

After expanding to the pressure of the next stage, this impure mixture is conducted into the next stage as a liquid, at a point corresponding to its composition. Here it is further separated, as previously described; the pure, liquid, product is drawn off, either at the head or the foot of the column, and conducted into the last stage, while the impure liquid mixture, in which the component present in smaller amount in the original mixture has become concentrated, is conducted as a liquid, at a point corresponding to its composition, into the next stage.

From the last stage of the main column, then there is removed an impure mixture in which the component present in smaller amount in the original mixture is greatly concentrated, and the same is conducted into the auxiliary column, at the same pressure, for the recovery of this component in pure form.

When the lower-boiling component is present in greater amount in the original gas, there would be removed from the foot of the last step an impure fluid mixture and the same would be conducted to the auxiliary column. In this, a larger part of the higher-boiling component would be separated pure and could be removed, while the remainder is conducted back in gas form to the last step of the main column. The pool in the sump of the auxiliary column may be heated with crude gas.

When the higher-boiling component is present in larger amount in the original gas, a gaseous mixture is removed at the head of the last stage of the main column and conducted to the auxiliary column, in which this higher-boiling component is recovered pure and may be drawn off, while the residual gas flows back to the last stage of the main column. The auxiliary column and the last stage of the main column contain in their top parts condenser-evaporators. To these condenser-evaporators there are conducted from outside at least part of the higher-boiling component drawn off in all the stages, and in them are at least partially evaporated. The sump pool of the first stage of the main column can preferably be heated by the condensing higher-boiling component, which is preferably taken from the decomposing apparatus itself.

The invention will be described in greater particularity and with reference to the accompanying drawings in which FIG. 1 is a graph of boiling curves of $C_2H_4$—$C_2H_6$ mixtures, and FIGS. 2 and 3 are diagrammatic representations of apparatus units for carrying out the process according to this invention.

The main column consists of three stages, which for the sake of clarity are shown as of equal size.

To illustrate the process, the separation of an ethane-ethylene mixture will be described; however, the invention is not limited to this and can be applied by suitable means to any of the gas mixtures already described.

FIG. 2 shows one form of design, in which the crude gas with a lower content in higher-boiling gas is separated.

Figure 3:
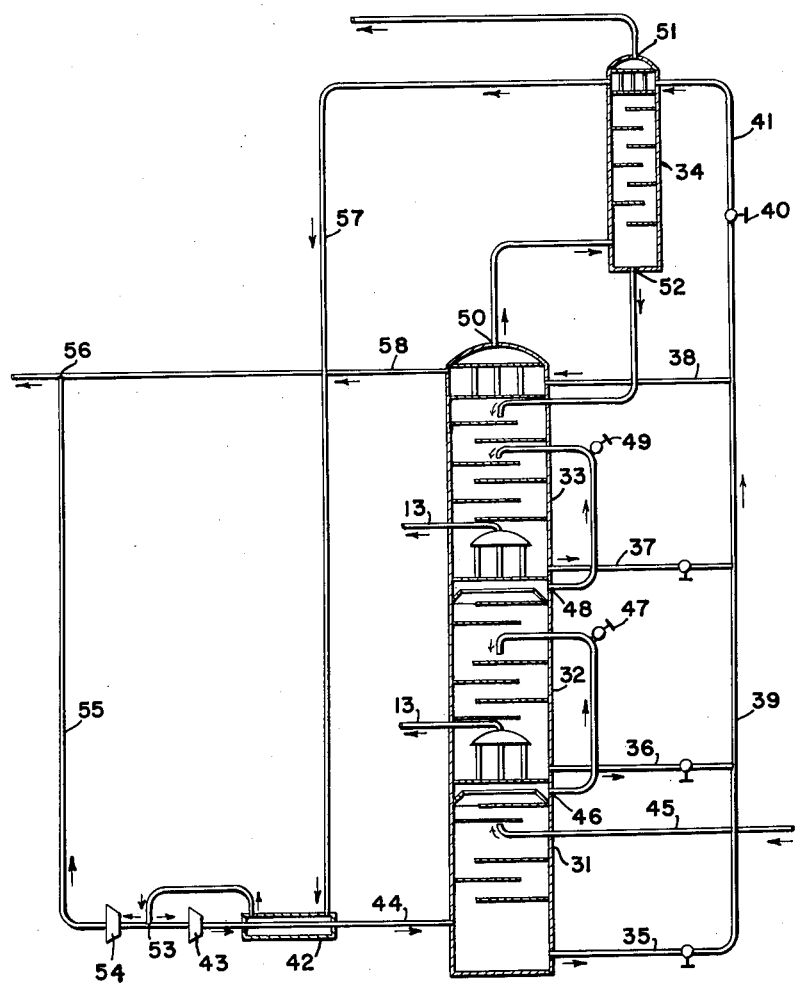
FIG. 3 shows an example for separating crude gas with a lower content in the lower-boiling gas.

In FIG. 1, the abscissa represent molecular percentages of higher-boiling component in liquid state while the ordinates represent molecular percentages of higher-boiling component in gaseous state.

In FIG. 2: 1, 2 and 3 are stages of the main column, 4 is the auxiliary column. Through pipe 5, for example 1000 cubic meters per hour of a liquid $C_2$ gas mixture, consisting of about 70% $C_2H_4$ and 30% $C_2H_6$, is removed from a methane tower operating at atmospheric pressure, and by means of a pump 6 is advanced through pipe 7 into the first separation stage 1 which is under a pressure of about 4 atmospheres. There the mixture is separated into pure liquid ethylene, which collects at the head of the column at 14, and a liquid enriched in ethane, which goes to the foot of the column. This latter liquid is drawn off, expanded through valve 11 to the pressure prevailing in stage 2 of about 2.6 atmospheres, and introduced through line 17, at a point corresponding to its composition, into the second rectifying stage. Here the mixture is further separated. At 18, pure liquid ethylene is removed again, expanded through valve 19 to the pressure of the last stage 3, and removed at the head of this column through line 21 along with that removed at 14 and expanded through valve 15, as washing fluid. The impure sump liquid of stage 2 is expanded at 16 and conducted through line 20 into stage 3 at a point corresponding to its composition. At the head of this stage, pure ethylene gas is removed through line 22, while at the foot the liquid mixture, enriched in ethane, is removed through line 25 and conducted to the auxiliary column. In the auxiliary column pure, liquid, ethane is separated at the foot of the column and can be removed through valve 28 at 26, while the gaseous impure ethylene is conducted back, through line 30, into stage 3, which, like the auxiliary column, is operated at a little above atmospheric pressure. The auxiliary column is heated by crude gas flowing through line 27.

For the heating of the column 1 (stage 1) pure ethylene is used, which is branched off at 23 from line 22 and conducted through line 8 to a compressor 9. In the latter it is compressed to about 6 atmospheres and is conducted through coil 10 in the foot of column 1. Here it condenses, so that it evaporates the sump fluid in stage 1. It is then expanded through valve 12, to be fed likewise through line 21 as washing liquid into stage 3. Pure ethylene is removed at 24. The lines 13 serve to remove air from the condenser-evaporators marked 29.

In FIG. 3, the stages of the main column are 31, 32 and 33. The auxiliary column is 34. The crude gas rich in ethane flows, at a pressure of about 6.6 atmospheres, through line 45 into stage 31 of the main column, at a point suitable to its composition, and is there liquefied and rectified, while at the foot of this column, pure ethane is recovered and removed through line 35. At the head of this stage, impure ethylene is removed through line 46, expanded to about 5 atmospheres through valve 47 and conducted into stage 32 at a point—between head and foot—corresponding to its composition. There, pure ethane falls to the foot again, and is removed through line 36, while at the head impure ethylene occurs, which latter is drawn off as a liquid through line 48, expanded through valve 49 to about 2.4 atmospheres, and put into the last stage 33 at the proper point for its composition. Here again pure liquid ethane is removed at the foot through line 37, while from the head of the column impure gas, enriched in ethylene, is conducted through line 50 to the auxiliary column 34. At the head of the auxiliary column there is obtained, then, at 51 pure gaseous ethylene with a pressure of about 2 atmospheres. The liquid ethane-ethylene mixture occurring at the foot of this column is conducted through line 52 as a washing liquid into the stage 33 of the main column. The pure liquid ethane drawn off through lines 35, 36 and 37 at the feet of the several column is expanded by a valve to about 1.2 atmospheres and conducted to a collection line 39. From this latter, about one-half of the liquid goes through line 38 to the condenser-evaporator at the head of stage 33 of the main column; the other half goes through valve 40 and line 41 at a pressure of about 0.75 atmosphere to the condenser-evaporator at the head of the auxiliary column and evaporates there. The resultant gas is conducted through line 57 to a heat exchanger 42 and is then divided at point 53. One part of the gas is then compressed to about 6.6 atmospheres in the compresser 43 and goes in counter-current with itself through heat-exchanger 42 and to the foot of stage 31, while the other part is compressed to about 1.2 atmospheres in compresser 54 and is removed through line 55. At point 56 this stream of gas unites with the pure gaseous ethane coming through line 58 from the condenser-evaporator at the head of stage 33 of the main column.

In the processing of, for example, 1000 (normal) cubic meters per hour of crude $C_2$ gas mixture, which consists of 80% ethane and 20% ethylene, and is fed into the unit at 45, there may flow, for example, 400 (normal) cubic meters per hour ethane through line 57, 490 cubic meters through line 58 and 90 cubic meters through line 44. At 56, about 800 normal cubic meters per hour pure ethane can be drawn off; at 51 about 200 normal cubic meters per hour pure ethylene.

I claim:

1. Process for the separation of a gas mixture comprising a higher boiling component and a lower boiling component, the content of one component being greater than that of any other component, by low temperature rectification in a main rectifying column consisting of at least three rectifying stages connected in succession, transferring the heat set free by the condensation of the gas flowing into the top of a lower stage being under higher pressure to the sump of a higher stage being under lower pressure for evaporating the sump liquid boiling therein, and an auxiliary rectifying column, which comprises feeding the gas mixture to be separated into the first stage under the highest pressure, at a point between head and foot of said stage corresponding to its composition and effecting a first stage separation, with-drawing a first liquid part of that component which was present in larger volume in the original gas mixture from the first stage as first pure product, with-drawing impure product from said first stage and conducting it into the second stage being under lower pressure between head and foot of said stage, with-drawing a second liquid part of said larger-volumed component from said second stage as a further portion of said first pure product, withdrawing impure product from said second stage and conducting it to a succeeding stage which is maintained at a lower pressure than that obtaining in the preceding stage, between head and foot of said succeeding stage, withdrawing a last part of said larger volumed component from the last stage of the main rectifying column under the lowest pressure as said first pure product, withdrawing impure product from said last stage and conducting it to said auxiliary rectifying column and rectifying said impure product therein under the same pressure to recover as second pure product the lesser-volumed component, withdrawing impure gas mixture from the auxiliary rectifying column and returning it to said last stage of the main rectifying column.

2. Process for the separation of a gas mixture with a majority of a lower boiling component by low temperature rectification in a main rectifying column consisting of at least three rectifying stages connected in succession, transferring the heat set free by the condensation of the gas flowing into the top of a lower stage being under higher pressure to the sump of a higher stage being under lower pressure for evaporating the sump liquid boiling therein, and an auxiliary rectifying column, feeding the gas mixture to be separated into the first stage under the highest pressure, at a point between head and foot of said stage corresponding to its composition and being separated in a first step, withdrawing a first liquid part of a low boiling component from the top of the first stage as the first pure product, withdrawing a liquid gas mixture from the sump of the first stage and conducting it into the second stage being under lower pressure between head and foot of said second stage, withdrawing a second liquid part of said low boiling component from the top of said second stage as said first pure product, withdrawing a liquid gas mixture from the sump of said second stage and conducting it to a succeeding stage maintained at a lower pressure than that obtaining in the preceding stage, between head and foot of said succeeding stage, withdrawing a last and gaseous part of said low boiling component from the top of the last stage of the main rectifying column under the lowest pressure as said first pure product, withdrawing a liquid gas mixture from the sump of said last stage and conducting it to the top of said auxiliary rectifying column as reflux, withdrawing a part of a higher boiling component from the sump of the auxiliary rectifying column as the second pure product, withdrawing the gaseous mixture in the top of the auxiliary rectifying column and conducting it to the sump of said last stage of the main rectifying column.

3. Process for the separation of a gas mixture with a majority of a higher boiling component by low temperature rectification in a main rectifying column consisting of at least three rectifying stages connected in succession transferring the heat set free by the condensation of the gas flowing into the top of the lower stage being under relatively higher pressure to the foot of the higher stage being under relatively lower pressure for evaporating the sump liquid boiling therein, and an auxiliary rectifying column, feeding the gas mixture to be separated into the first stage under the highest pressure at a point between top and foot of the column corresponding to its composition and being separated in a first step, withdrawing a first liquid part of a high boiling component from the sump of the first stage as the first pure product, withdrawing a liquid gas mixture from the sump of the first stage as the first pure product, withdrawing a liquid gas mixture from the top of said first stage and conducting it into the second stage, being under a lower pressure than that obtaining in said first stage at a point between head and foot of said second stage, withdrawing a second liquid part of said high boiling component from the sump of said second stage as said first pure product, withdrawing a liquid gas mixture from the top of said stage and conducting it to a third stage under a lower pressure than that obtaining in the preceding stage between head and foot of said third stage, withdrawing a last liquid part of said low boiling component from the sump of the last stage of the main rectifying column under the lowest pressure as said pure product, withdrawing a gaseous gas mixture from the top of said last stage and conducting it to the foot of said auxiliary rectifying column, withdrawing a part of a lower boiling component from the top of said auxiliary rectifying column as the second pure product, withdrawing the reflux from the foot of the auxiliary rectifying column and conducting it to the top of said last stage of the main rectifying column.

4. Apparatus for the separation of a gas mixture by low temperature rectification which comprises: a main rectifying column consisting of at least three rectifying stages, means for heat exchange between the top of a stage and the foot of the following next stage, being under lower pressure, means for heating the lower portions of the first stage, means for maintaining a descending order of pressures in said first, second and any subsequent stages, means for introducing the fluid to be separated into said first stage between the foot and the head of said first stage, means for transferring liquid from the foot of said first stage to the second stage between the foot and head of said second stage, means for transferring liquid from the foot of said second stage to the next stage between the foot and head of said next stage, means for transferring liquid from the foot of the stage being under relatively higher pressure to the stage being under relatively lower pressure between the foot and head of said stage, means for transferring liquid from the top of the first and second and any subsequent but the last stage being under the lowest pressure to the head of said last stage of said main rectifying column being under the lowest pressure means for withdrawing gas from the head of said last stage being under the lowest pressure, and for feeding a part of it to a compressor, means for transferring gas from said compressor to said means for heating the lower portions of said first stage, means for transferring liquid from said means for heating the lower portion of said first stage to the top of the last stage, an auxiliary rectifying column containing means for heating the lower portion of said auxiliary rectifying column, means for transferring liquid from the foot of said last stage of said main rectifying column to the head of said auxiliary column, and means for transferring gas from the head of said auxiliary column to the foot of said last stage of said main rectifying column.

5. Apparatus for the separation of a gas mixture by low temperature rectification which comprises: a main rectifying column consisting of at least three rectifying stages, means for heat-exchange between the top of a stage and the foot of the next following stage being under lower pressure, means for cooling the upper portions of the last stage being under the lowest pressure, means for maintaining a descending order of pressures in said first, second and any subsequent stages, an auxiliary rectifying column containing means for cooling the upper portions of said auxiliary column, means for introducing fluid to be separated into the foot of the first stage, means for transferring liquid from the head of said first stage to the second stage between the foot and the head of said second stage, means for transferring liquid from the foot of said second stage to the next stage between the foot and the head of said next stage, means for transferring liquid from the foot of the stage being under higher pressure to the stage being under lower pressure between the foot and head of said stage being under relatively lower pressure, means for transferring liquid from the foot of said first, second and any subsequent stages to said means for cooling the upper portions of said last stage being under the lowest pressure and to said means for cooling the upper portions of said auxiliary rectifying column, means for transferring gas from said means for cooling the upper portions of said auxiliary rectifying column to a heat-exchanger in counterflow to a return stream of said gas, means for transferring a part of said gas from the heat-exchanger to a compressor and from the compressor to said heat-exchanger and from the heat-exchanger to the foot of said first stage of said main rectifying column, means for transferring another part of said gas from the heat-exchanger to an expansion engine and for withdrawing from the engine, means for withdrawing gas from said means for cooling the upper portion of said last stage of the main rectifying column, means for transferring gas from the head of said last stage of said main rectifying column to the foot of said auxiliary rectifying stage, means for transferring liquid from the foot of said auxiliary rectifying column to the head of said last stage of said main rectifying stage, and means for withdrawing gas from the head of said auxiliary column.

References Cited in the file of this patent
UNITED STATES PATENTS

| | | |
|---|---|---|
| 1,945,367 | Gobert | Jan. 30, 1934 |
| 2,146,197 | Twomey | Feb. 7, 1939 |
| 2,547,177 | Simpson | Apr. 3, 1951 |